(12) United States Patent
Bertagnole et al.

(10) Patent No.: US 8,060,071 B2
(45) Date of Patent: Nov. 15, 2011

(54) ENTERPRISE MOBILITY USER

(75) Inventors: Albert G. Bertagnole, Parsippany, NJ (US); David L. Chavez, Broomfield, CO (US); Jennifer L. Crowley, Thornton, CO (US); Jeffrey Meis, Broomfield, CO (US); Mark T. Rolfs, Fort Collins, CO (US)

(73) Assignee: Avaya Inc., Basking Ridge, NJ (US)

( * ) Notice: Subject to any disclaimer, the term of this patent is extended or adjusted under 35 U.S.C. 154(b) by 152 days.

(21) Appl. No.: 11/502,200

(22) Filed: Aug. 9, 2006

(65) Prior Publication Data

US 2008/0039080 A1   Feb. 14, 2008

(51) Int. Cl.
*H04M 3/42* (2006.01)
(52) U.S. Cl. ........... 455/417; 455/414.1; 455/415; 455/416; 370/259; 370/271; 370/265; 370/328; 370/338; 379/211.01; 379/211.02
(58) Field of Classification Search .......... 455/414, 455/417, 433, 414.1, 432.1, 432.3, 453.1, 455/453.2; 370/259, 310, 352, 356; 379/201.01–211.04, 212.01
See application file for complete search history.

(56) References Cited

U.S. PATENT DOCUMENTS

| | | | |
|---|---|---|---|
| 5,745,850 A * | 4/1998 | Aldermeshian et al. | 455/417 |
| 5,963,866 A | 10/1999 | Palamara et al. | |
| 6,144,671 A | 11/2000 | Perinpanathan et al. | |
| 6,587,688 B1 * | 7/2003 | Chambers et al. | 455/433 |
| 7,031,697 B2 * | 4/2006 | Yang et al. | 455/414.1 |
| 7,110,516 B2 | 9/2006 | Sarp et al. | |
| 7,120,243 B2 | 10/2006 | Milton | |
| 7,245,709 B2 | 7/2007 | Dobner et al. | |
| 7,245,912 B1 | 7/2007 | Fenton et al. | |
| 7,457,289 B2 | 11/2008 | Wang | |
| 2002/0181398 A1 * | 12/2002 | Szlam | 370/230 |
| 2002/0191595 A1 * | 12/2002 | Mar et al. | 370/352 |
| 2003/0134631 A1 * | 7/2003 | Snyder et al. | 455/423 |
| 2003/0174648 A1 | 9/2003 | Wang et al. | |
| 2004/0028205 A1 * | 2/2004 | Lim et al. | 379/211.02 |
| 2004/0062382 A1 * | 4/2004 | Sylvain | 379/265.06 |
| 2004/0072590 A1 * | 4/2004 | Eynard et al. | 455/554.1 |

(Continued)

FOREIGN PATENT DOCUMENTS

EP   1450569   8/2004

(Continued)

OTHER PUBLICATIONS

"Mitel Networks 5810 PDA Application Installation Instructions"; 2001; 13 pages; Mitel Networks Corporation; Canada.

(Continued)

*Primary Examiner* — Nick Corsaro
*Assistant Examiner* — Chuong A Ngo
(74) *Attorney, Agent, or Firm* — Sheridan Ross P.C.

(57) ABSTRACT

In one embodiment, an enterprise network is provided that includes a mobility agent 150 associated with a switch/server 100 or 104. The mobility agent creates a visitor application record 172 associated with a second communication device 140b. The visitor application record is associated with a first subscriber. A second subscriber is normally associated with the second communication device, and the first subscriber with a first communication device 136a. In response to creating the visitor application record, the native communication device record is associated with a virtual communication device having the same public and/or private numbers as the second communication device 140b.

10 Claims, 3 Drawing Sheets

U.S. PATENT DOCUMENTS

| | | | |
|---|---|---|---|
| 2004/0082332 A1* | 4/2004 | McCann et al. | 455/445 |
| 2004/0179666 A1* | 9/2004 | Milton | 379/201.02 |
| 2004/0225747 A1 | 11/2004 | Kadi | |
| 2005/0003804 A1* | 1/2005 | Huomo et al. | 455/414.1 |
| 2005/0113077 A1* | 5/2005 | Bushnell et al. | 455/417 |
| 2005/0147226 A1 | 7/2005 | Anupam et al. | |
| 2005/0207397 A1 | 9/2005 | Berndt et al. | |
| 2006/0043164 A1 | 3/2006 | Dowling et al. | |
| 2006/0072726 A1* | 4/2006 | Klein et al. | 379/201.01 |
| 2007/0217593 A1* | 9/2007 | Pfleging et al. | 379/211.02 |
| 2007/0269024 A1 | 11/2007 | Dalrymple et al. | |
| 2008/0002820 A1* | 1/2008 | Shtiegman et al. | 379/211.02 |
| 2008/0181106 A1 | 7/2008 | Bertagnole et al. | |

FOREIGN PATENT DOCUMENTS

| | | | |
|---|---|---|---|
| EP | 1487186 | 12/2004 | |
| JP | H06-77997 | 3/1994 | |
| JP | H09-247742 | 9/1997 | |
| JP | 2001-197206 | 7/2001 | |
| JP | 2003-102046 | 4/2003 | |
| JP | 2004-512750 | 4/2004 | |
| JP | 2004-254323 | 9/2004 | |
| JP | 2005-323317 | 11/2005 | |
| JP | 2006-140922 | 6/2006 | |
| WO | WO0059188 | * 10/2000 | 455/411 |
| WO | WO 01/76206 A1 | 10/2001 | |
| WO | WO 02/33984 | 4/2002 | |
| WO | WO 02/078368 | 10/2002 | |
| WO | WO 2005/107122 A3 | 11/2005 | |

OTHER PUBLICATIONS

"Mitel 5240 IP Phone Web-enabled IP Phone Data Sheet"; 2005; 2 pages; Mitel Networks Corporation.

"Mitel 5230 IP Phone"; Available at http://www.mitel.com/DocController?documentId=9563; undated; Mitel Networks Corporation.

"Avaya Communication Manager, Enabling Intelligent, Highly Available and Open Communications Across Your Enterprise"; 2006; 8 pages; Avaya Inc.

"Configuring Avaya Communication Manager for H.323 Signaling and IP Trunks with Nortel Succession 1000—Issue 1.0"; Solution & Interoperability Test Lab Application Notes; 2005; 53 pages; Avaya Inc.

"Avaya IP Telephony Implementation Guide Communication Manager 3.0"; Jul. 2005; 77 pages; Avaya Inc.

"Creating Caller Applications With Modular Messaging 1.1—Issue 1.0"; Solution & Interoperability Test Lab Application Notes; 2004; 21 pages; Avaya Inc.

"Cisco CallManager Extension Mobility"; Cisco CallManager Features and Services Guide; undated; 36 pages.

"Avaya EC500 Product Summary"; Available at: http://www.avayaglobalconnect.com/ipTelephony/eclips_ec500_summary.asp; undated; 2 pages.

Tom Starner; "Office Hotelling Makes Room for Improvement"; IQ Magazine; Available at: http://www.cisco.com/web/about/ac123/iqmagazine/archives/mar_apr_2003/departments/net_strategies/workforce.html; Mar./Apr. 2003; 3 pages; Cisco Systems, Inc.

Fred Sandsmark; "Enhanced Communications with IP Telephony"; IQ Magazine; Available at: http://www.cisco.com/web/about/ac123/iqmagazine/archives/may_june_2003/features/enhanced_communications.html; May/Jun. 2003; 5 pages; Cisco Systems Inc.

"IQ Magazine Mar./Apr. 2003"; Available at http://www.cisco.com/web/about/ac123/iqmagazine/archives/mar_apr_2003; Mar./Apr. 2003; 3 pages; Cisco Systems Inc.

"Avaya Demonstrates New IP Telephony Applications at CommunicAsia 2001"; Available at: http://www.avaya.com/gcm/master-usa/en-us/corporate/pressroom/pressreleases/2001/pr-010619a.htm; Jun. 19, 1920; 3 pages; Avaya Inc.

"Red Deer Public Library is Open for Discovery with the Avaya IP Office Solution"; 2002; 4 pages; Avaya Inc.

"Desk/Flex—Corporate Hoteling/Flexible Desk Sharing for Your Meridian 1 and CS 1000"; 2005; 2 pages; Professional Resource Management, Inc.

UK Intellectual Property Office Search report on corresponding patent application GB0715046.9 issued Dec. 7, 2007, 4 pages.

Official Action for U.S. Appl. No. 12/277,023, mailed Aug. 7, 2009.

Official Action for U.S. Appl. No. 12/277,023, mailed Dec. 17, 2009.

Official Action for U.S. Appl. No. 12/277,023, mailed Feb. 26, 2010.

Examination Report for UK Patent Application No. 0715046.9, dated Apr. 1, 2010.

Examiner's First Office Action (including translation) for Japanese Patent Application No. 2007-207492, dated Mar. 18, 2010.

Official Action for Japan Patent Application No. 2007-207492, dispatched Nov. 10, 2010.

Official Action for Canada Patent Application No. 2591381, dated Jan. 10, 2011.

Notice of Allowability for U.S. Appl. No. 12/277,023, mailed Aug. 9, 2010.

Official Action (with English translation) for Japan Patent Application No. 2007-207492, dispatched Apr. 18, 2011 4 pages.

Official Action for United Kingdom Patent Application No. GB0715046.9, dated Jul. 1, 2011 6 pages.

\* cited by examiner

ENTERPRISE MOBILITY USER

FIELD OF THE INVENTION

The invention relates generally to telecommunications systems and particularly to wired mobility in telecommunications systems.

BACKGROUND OF THE INVENTION

Enterprise user mobility, or the ability of subscribers to use stations located across the enterprise network while still being able to receive consistent phone service, is highly desirable in the global marketplace. Many large companies are commonly decentralized with large campuses and branch offices located around the world. Preferably, enterprise user mobility provides subscribers with the continued access to features and other functionality located on the subscriber's home, or assigned, station.

Enterprise user mobility is currently being offered in Voice over Internet Protocol or VoIP products of various vendors, such as Extension Mobility™ by Cisco. The Cisco product has an extensive Application Program Interface or API that allows access to third party applications to setup the home and visited, or remote, VoIP stations for remote access without the subscriber needing to touch either handset. To effect the reconfiguration of the remote station, the system administrator uses the API to enter a User Identifier or UI and Personal Identification Number or PIN. When the subscriber logs into the visited station and is successfully verified, the visited station automatically reconfigures with the subscriber's home station profile information. Where more than one switch is involved at the locations of the home and visited station, call processing is performed at the home switch and not the visited switch because the visited switch simply acts as a router.

These products, however, are limited to VoIP stations and are not adaptable to circuit-switched or Time Division Multiplexed or TDM telephones. IP networks generally provide an excellent infrastructure for geographically distributing components of a telecommunication system. The underlying IP network is optimal for transmission for control signaling, and, when bandwidth is available, can provide an acceptable Quality of Service (or QoS) or Grade of Service (or GOS) for voice communications. However when insufficient network resources are available for voice communications or one or more IP network components are down, voice communications can be adversely impacted. While great strides have been made to provide improved levels of voice quality in VoIP communications, rapid and unexpected deteriorations in the QoS or GOS still occur with some frequency and are unacceptable for many businesses.

For this reason, many businesses prefer wired circuit-switched or TDM communication devices. Although intra-switch wired mobility, such as hoteling or hot-desking, is known, inter-switch enterprise user wired mobility is not available for circuit-switched or TDM communication devices, particularly wired mobility in which the subscriber has close to the full functionality that the subscriber would have if he or she were at his or her home station. As will be appreciated, hoteling or hot-desking is a function that allows subscribers, without a native station, to be assigned anywhere in the local area network controlled by a common enterprise switch. Additionally, even with IP enabled mobility the native subscriber normally associated with the remote IP phone taken over by the traveling subscriber is no longer associated with that IP phone. This can create problems with the native subscriber having remote access to the features of the IP phone, such as abbreviated dial, bridged appearance, dial intercom, and the like.

SUMMARY OF THE INVENTION

These and other needs are addressed by the various embodiments and configurations of the present invention. The present invention is directed to subscriber mobility in a centralized or decentralized enterprise network.

In a first embodiment, a method includes the steps of:

(a) providing a native communication device record for a second communication device associated with a second subscriber;

(b) thereafter creating a visitor application record associated with the second communication device, the visitor application record being associated with a first subscriber different from the second subscriber and the first subscriber normally being associated with a first communication device; and (c) in response to step (b), associating the native communication device record with a virtual communication device, the virtual communication device having the same public and/or private numbers as the second communication device.

While the first subscriber is associated with the second communication device, a home communication device record is maintained for the first communication device. The home communication device record configures the first communication device for the first subscriber. While the first subscriber is associated with the second communication device, a home application record is maintained to redirect incoming calls for the first communication device to the second communication device.

The native communication device and visitor application records are maintained independent of one another while the first subscriber is associated with the second communication device. This permits the second subscriber to receive incoming calls to the second communication device, make calls remotely using, as call origination information, number of the second communication device, and access remotely features of the second communication device and the first subscriber to receive incoming calls at, make outgoing calls from, and access first communication device features from the second communication device. This permits the second subscriber to become a remote user of another enterprise communication device while his home communication device is in use by the first subscriber. This implementation is thus fundamentally different from logging out of an IP communication device and logging into another IP device at a different geographical location but keeping the home office as the IP station's gatekeeper.

The first embodiment may be used to provide intra- and inter-switch and packet-switched and circuit-switched subscriber mobility.

In another embodiment, a method is provided that includes the steps of:

(a) a second switch/server receiving a request from a first subscriber to be associated with a second communication device controlled by the second switch/server, the first subscriber also being associated with a first communication device controlled by a first switch/server different from the second switch/server;

(b) the second switch/server notifying the first switch/server of the request; and (c) the second switch/server associating the second communication device with the first subscriber. The first subscriber is able to make outgoing calls from and receive incoming calls at the second communication device and to access at least some features accessible by the first subscriber at the first communication device.

The present invention can have a number of advantages. It can allow subscribers to roam in an enterprise network while still retaining at least some of their home station capabilities. This provides a network wide hot-desking capability. Second, it can provide service in a simple and robust way with straightforward administration but not requiring new network components/servers. This ease of incorporation into existing enterprise network architectures is made by possible by the software enablement of the mobility feature. It can enable balancing of call processing loads among multiple switches/servers.

The present invention can provide a number of advantages depending on the particular configuration.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
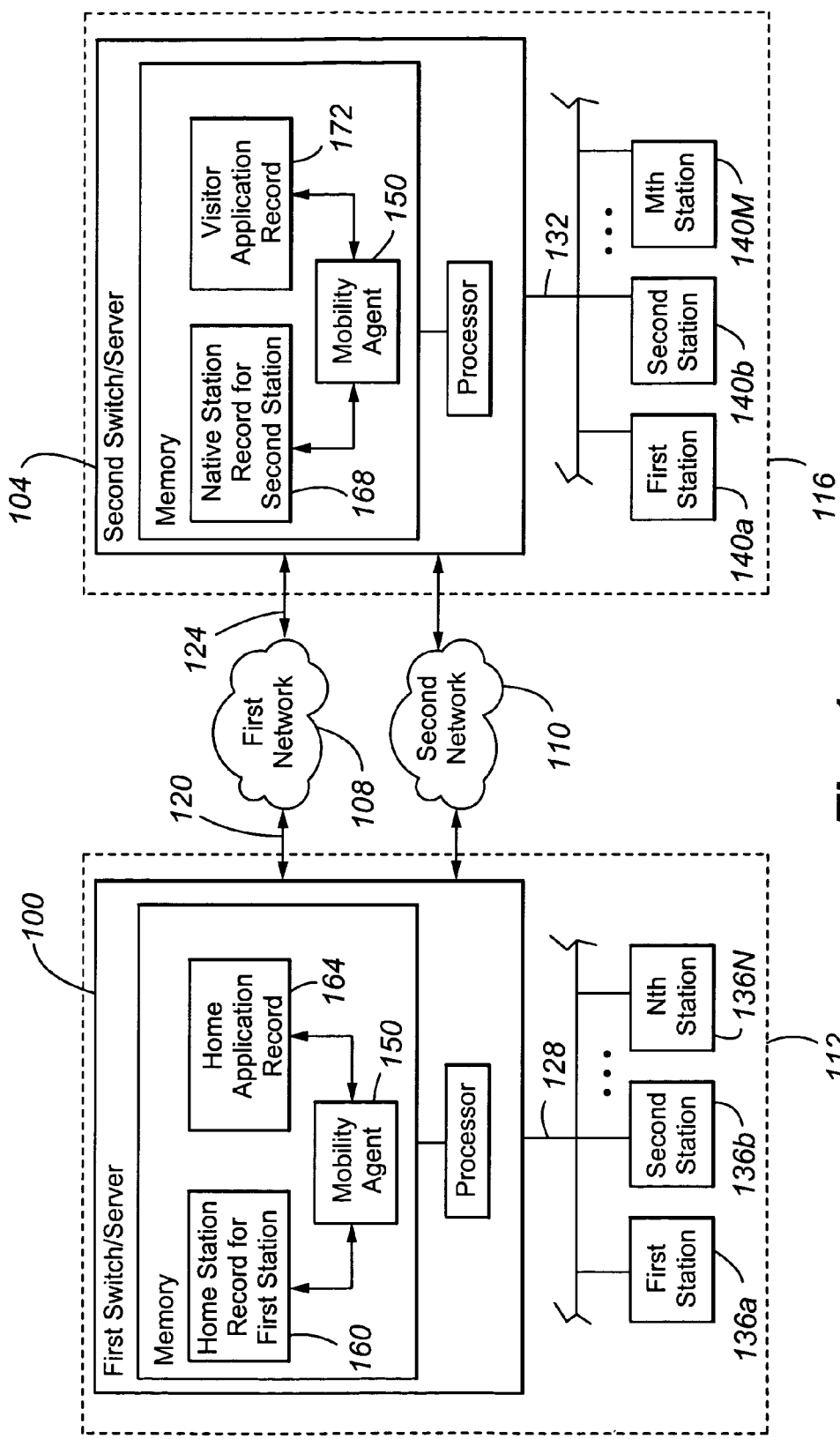
FIG. 1 is a block diagram of an architecture according to an embodiment of the present invention.

According to a first embodiment of the present invention, first and second enterprise switch/servers 100 and 104 are interconnected by first and second private and/or public networks 108 and 110. The terms "switch", "server", and "switch and/or server" as used herein should be understood to include a PBX, an ACD, an enterprise switch, an enterprise server, or other type of telecommunications system switch or server, as well as other types of processor-based communication control devices such as media servers, computers, adjuncts, etc. Each of the first and second switch/server 100 and 104 services corresponding first and second enterprise premises 112 and 116, respectively. In one configuration, the first network 108 is a circuit-switched network, such as the Public Switch Telephone Network or PSTN, while the second network 110 is a packet-switched network, such as the Internet. Each of the first and second switches is connected via a plurality of trunks 120 and 124, respectively, (which may be for example Primary Rate Interface, Basic Rate Interface, Internet Protocol, and H.323 trunks) to the network 108 and via link(s) 128 and 132, respectively, to the first, second, . . . Nth stations 136a-n and first, second, . . . Mth stations 140a-m, respectively. A gateway (not shown), such as Avaya Inc.'s, G700™, G650™, G600™, MCC/SCC™ media gateways, may be positioned logically between each of the first and second switches/servers and the second network 110 to process communications passing between the appropriate switch/server and the second network.

The stations, or communication devices, 136a-n and 140a-m are circuit-switched and/or TDM devices. As will be appreciated, the stations 136 and 140 are normally plugged into a Tip ring interface that causes electronic signals from the station to be placed onto a TDM bus (not shown). Each of the stations corresponds to one of a set of internal (Direct-Inward-Dial) extensions on its controlling switch/server. The controlling switch/server can direct incoming contacts to and receive outgoing contacts from these extensions in a conventional manner. The stations 136 and 140 can include, for example, wired and wireless telephones, PDAs, H.320 video phones and conferencing units, voice messaging and response units, and traditional computer telephony adjuncts. Examples of suitable devices are the 30010™, 2410™, and 2420™ Digital Telephones of Avaya, Inc.

Although not shown, each of the first and second premises 112 and 116 can include packet-switched stations or communication devices, such as IP hardphones (e.g., Avaya Inc.'s 4600 Series IP Phones™), IP softphones (e.g., Avaya Inc.'s IP Softphone™), Personal Digital Assistants or PDAs, Personal Computers or PCs, laptops, packet-based H.320 video phones and conferencing units, packet-based voice messaging and response units, and packet-based traditional computer telephony adjuncts. Examples of suitable devices are the 4610™, 4621 SW™, and 9620™ IP telephones of Avaya, Inc.

It should be noted that the invention does not require any particular type of information transport medium or protocol between switch/server and stations and/or between the first and second switches/servers, i.e., the invention may be implemented with any desired type of transport medium as well as combinations of different types of transport media. For example, the inter-switch protocols may be QSIG, SIP, H.323, and the like. Inter-agent 150 control signaling can be transmitted over the first and/or second network.

Each of the first and second switches/servers 100 and 104 are preferably software-controlled and include a controlling application, such as a modified form of Communication Manager™ by Avaya, Inc. As can be seen from FIG. 1, the memory of each of the first and second switches/servers include a mobility agent 150 to provide mobility for wired subscriber stations. The mobility agents 150 provide the capability of subscribers to register as a remote user at premises controlled by a different switch/server than the premises of the subscriber's home station. Upon registration, the mobility agent 150 of the home switch/server forwards an image of the subscriber's home station to mobility agent 150 of the visited, or remote, switch/server. The mobility agent 150 in the visited switch/server downloads the image to the visited station.

Incoming calls to the subscriber are routed to the visited station of the subscriber but most, if not all, of the functionality accessible to the subscriber via his or her home station is retained in the subscriber's home switch/server. Examples of such functionality include bridging (e.g., providing a bridged call appearance to permit an assistant bridge onto the subscriber's call), call coverage (e.g., call coverage answer group), speed-dials, ringing patterns, customized text labels, abbreviated dial lists, automatic message waiting, automatic dial (e.g., call back), automatic intercom, busy indication for another extension or trunk, call appearance, call forwarding, call forward (busy/do not answer), dial intercom, extension to cellular (discussed below), exclusion, personal Central Office or CO-line (per-CO-line), send all calls, hunt group or internal extension group, priority calling, and attendant calling. This list is an example of Avaya features and not exhaustive of the features that can be supported with this approach. For outgoing calls, the subscriber's normal home (enterprise) identity (e.g., home telephone number) is sent as the calling party information regardless of whether the call is processed at the home or visited station. Where the call is processed at the visited switch/server and the first network 108 will not accept the subscriber's normal calling party information (e.g., name and home station phone number), the subscriber's calling information for the visited station (e.g., name and visited station phone number) is sent as an option. Emergency (e.g., 911) calls are processed by sending only locally applicable calling party information to ensure that emergency response personnel can respond correctly and effectively as well as call back if the need arises. For example, if the subscriber were to make an emergency call from the visited station, the visited switch/server would provide to the Public Safety Access Point or PSAP the telephone number and/or location information (e.g., Emergency Location Information Number of ELIN) of the visited station not the subscriber's home station.

In the following paragraphs, the functionality of the architecture will be discussed with reference to a specific example. In the example, a first subscriber having, as his or her home station, the first station 136a controlled by the first switch/server 100 registers, as his or her visited station, the second station 140b controlled by the second switch/server 104. As discussed below, the first and second stations 136a and 140b can be the same or different types of communication devices. In other words, they can have the same or different dial pad layout and buttons, call appearances, programmable keys, and feature access buttons.

With this example in mind, the memories of the first and second switches/servers include a number of data structures to affect the foregoing functionality. The data structures include the home station record 160 for the first station 136a, the home application record 164 for the first station 136a, the native station record 168 for the second station 140b, and the visitor application record 172 for the second station 140b. The home station record 160 is the administered record for the first station 136a and includes a variety of information, such as first subscriber's name (or UI), first subscriber public name, first station 136a private number (e.g., a five-digit internal extension), first station 136a public number (e.g., a 10-digit DID), first subscriber home security information (e.g., a security code such as PIN), first station 136a type, first station 136a button/key record (which provides, for each button/key the corresponding label or type and state), COS for the first station 136a, whether the first station 136a is mobility enabled, call state information (e.g., what call appearance is active, what call appearance is ringing, and the like), and a pointer to the home application record (if not concatenated to the home station record for the first station 136a). The home application record 164 includes the extension of the second station 140b, second station 140b type, a pointer to the home station record for the first station 136a (if not concatenated to the home station record for the first station 136a), and a pointer to the system 104 being visited. The native station record 168 for the second station 140b contains the same types of information as the home station record for the first station 136a, except that the information corresponds to the second subscriber. The second station 140b is the home station for the second subscriber. Finally, the visitor application record 172 includes all information needed for the first subscriber to make a call from the second station 140b. It therefore includes the first subscriber public name, first station 136a private number (e.g., a five-digit internal extension), first station 136a public number (e.g., a 10-digit DID), second station 140b private number, first subscriber home security information (e.g., a security code such as PIN), first and second station 136a and 140b types, call state information (e.g., what call appearance is active, what call appearance is ringing, and the like), and second station 140b button/key record having buttons/keys identical to those in the button/key record in the native station record 168. Preferably, the records 160, 164, 168, or 172 are object-oriented, though they may be relational data structures.

The visitor application record 172 and native station record for the second station 168 are independent of one another; that is, they are separate records, or located at physically distinct locations in memory, can both survive system resets, and generally do not point to or otherwise reference one another. This permits the second station to be used physically by the first (visiting) subscriber and logically by the second (native) subscriber. Stated another way, the native station record is associated with a virtual (or Administration WithOut Hardware or AWOH) station having the public and private numbers of the second station 140b, while the visitor application record is associated with the physical second station 140b. Thus, the second station 140b effectively has two identities, one is defined by the native station record 168 and the other by the visitor application record 172. In conventional mobility applications, the visited station loses the identity of its native second subscriber, or the native station record is replaced by the visitor application record 172.

The operation of the mobility agents 150 will now be described with reference to FIGS. 1-3.

The registration process commences in step 300 when the second station 140b receives from the first subscriber the feature access code of the mobility agent 150, the home extension of the first station 136a, and the first subscriber's authentication information.

In response, the mobility agent 150 of the second switch/server 104 sends, in step 304, a location update message 200 to the mobility agent 150 in the first switch/server 100. The location update message 200 includes the extension of the second station 140b, the extension of the first station 136a, the entered first subscriber's home security information, and the second station's 140 station type. The location update message 200 is effectively a registration request by the first subscriber to register for wired mobility from the first station 136a to the second station 140b.

In step 308, the mobility agent 150 of the first switch/server 100 receives the location update message 200 and compares the home security information in the home station record 160 against the entered home security information. If the information fails to match or if the home station record 160 indicates that the first station 136a is not eligible for wired mobility (e.g., using the COS permissions), the agent 150 denies the request and returns a denial message to the mobility agent in the second switch/server. If the information matches and if the home station record 160 indicates that the first station 136a is eligible for wired mobility, the agent 150 proceeds to step 312. If the home station record 160 indicated that the user is already associated with a different station, a deregistration indication will be passed to the visited system for the previously visited station.

In step 312, the mobility agent 150 in the first switch/server 100 creates a home application record 164 and a button map of the first station 136a. The button map can be any set of data structures defining the layout of the keys and buttons of the first station 136a. As will be appreciated, there are two types of buttons/keys, namely status buttons (e.g., a button that indicates the state of and, when pressed, invokes a feature such as send all calls) and call origination buttons (e.g., speed or abbreviated dial). The button map typically indexes button/key identifiers against corresponding status and origination button/key types or labels (or first subscriber selected or programmed functions or features) and states. At least each programmable button/key on the first station 136a, and in some applications nonprogrammable buttons/keys, has a corresponding button identifier. In other words, the map has, for each button/key identifier, a corresponding button/key type or label and button/key state. For example, the button map includes abbreviated dial buttons, intercom buttons, and bridged appearances of other extensions on the first station 136a. "Button" and "key" are used herein as alternate expressions for signal activators.

In step 316, the mobility agent 150 in the first switch/server 100 sends a location response 204 to the mobility agent 150 in the second switch/server 104. When the first and second stations are of the same type, the response 204 includes the first station type, button map, message waiting state indicator, first subscriber's public number, first subscriber's private number, and the first subscriber's public name. When the first and second stations are of different types, the response 204 may optionally include the second station's private number, the second station's public number, and the definition for the call appearances of the first station 136a for mapping to the visited set.

In step 320, the mobility agent 150 in the second switch/server 104 receives the awaited response 204 and creates the visitor application record 172. The second station button/key record is produced by the mobility agent 150 in the second switch/server 104 by mapping the button map of the first station 136a against the button/key layout of the second station 136b. When the first and second stations are of the same type, the home station record 160 and visitor application record 172 are substantially the same, though the layouts of the records differ. When the first subscriber activates buttons/keys on the second station 140b, the application record 172, and not the home station record 160, is used to determine the corresponding function.

In step 324, the mobility agent 150 in the second switch/server 104 reconfigures the second station 140b as defined in the visitor application record 172. When the first and second stations 136a and 140b are of different types only a default set of features are provided on the second station or, alternatively, matching keys/buttons are given common functionality. When the first and second stations 136a and 140b are of the same type, the stations appear to be the same to the first subscriber. The first station 136a, during the duration of mobility registration, displays that mobility registration is in effect and provides the private number of the second station 140b Deregistration is effected by the first subscriber entering a deactivate feature access code, the private extension of the first station 136a, and the security information. A deregistration message 220 containing this information is then sent from the second switch/server 104 to the mobility agent 150 at the first switch/server. After successful authentication, the registration is cleared at the first switch/server 100 and a response is returned to the mobility agent 150 in the second switch/server 104. In that event, the home and visitor application records 164 and 172 are cleared from memory. Deregistration can also be effected automatically by the expiration of an automatic deregistration timer or placement of an emergency call from the second station 140b. Deregistration may also be initiated at the first switch/server 100 by the first subscriber entering the deregistration information noted previously or automatically in the response of a successful registration of the user on another station.

Preferably, the messages 200, 204, 208, 212, 216, and 220 are sent out-of-band (e.g., over the D-channel in the QSIG protocol) relative to the voice channel to conserve bandwidth.

When there is an incoming call to the first station 136a while the first subscriber is mobility registered at the second station 140b, the mobility agent 150 in the first switch/server 100 determines from the application record 164 that mobility registration is in effect and that the first subscriber is registered at the second station 140b. The call setup message is forwarded to the mobility agent 150 in the second switch/server 104 to set up the call. When there is an incoming call to the second station 140b that is not routed via the first switch/server 100 while the first subscriber is mobility registered at the second station 140b, the mobility agent 150 in the second switch/server 104 determines from native station record 168 the proper treatment of the call, which includes directing the call to call coverage for the second subscriber. In this manner, the second subscriber can receive calls to the public and private numbers of the second station, make calls remotely that are associated with the second station, and access features remotely using feature access codes even while mobility registration is in effect for the first subscriber.

When, during mobility registration, the first switch/server receives an incoming call to the first subscriber, the mobility agent 150 in the first switch/server 100 generates and sends an appearance update message 216. The message 216 contains the first subscriber's private number for the first station 136a, the private number for the second station 140b, an identifier of the incoming call, and the call appearance selected for the incoming call. This can be important because the first and second switches/servers can be configured to select call appearances differently. By including the call appearance in the message 216, the same call appearance is used for the first and second stations 136a and 140b to identify the incoming call. The receipt of the update message 216 informs the second switch/server that the incoming call is for the first and not the second subscriber and therefore the mobility agent 150 in the second switch/server 104 uses the visitor application record 172 and not the native station record 168 to process the incoming call.

It is important to note that the second station 140b is tied to the visitor application record 172 during mobility registration and not the native station record 168. Thus, if an incoming call to the first subscriber is rung the second station 140b will be rung. However, if an incoming call to the second subscriber is rung the second station 140b will not be rung.

Incoming calls to the first subscriber while mobility registered at the second station are normally controlled by the first switch/server 100 and not the second switch/server 104. Home switch/server control of the call is preferably used so that call processing for call coverage or diversion into voice messaging is managed at the first switch/server 100. Using the first switch/server 100 to process incoming calls causes a first call to be set up between the calling party and the first switch/server and a second call to be set up between the first and second switches/servers. When all or part of the call processing is done by the second switch/server 104, the call will still be accessible at the first station or bridged appearances of that extension unless path replacement were to occur. Outgoing calls made using the dial pad on the second station 140b are processed by the second switch/server 104. However, call origination features accessed by the first subscriber at the second station 140b are normally processed at the first switch/server 100. For example when using a bridged appearance button, a call is set up to the first switch/server 100, and any call initiated using the dial pad of the second station 140*b* is processed by the first switch/server 100. Calls using an abbreviated dial or intercom feature button on the second station 140*b* to place the call are processed by the first switch/server 100 using the number stored in the abbreviated dial list on the first switch/server. This is preferable because dial string variances used in different locales to reach the same destination would be normal in different switches in a network. Even Automatic Route Selection or ARS access codes may vary by country due to local dialing customs. Using the first switch/server 100 to process such calls causes a first call to be set up between the first and second switches/servers and a second call to be set up between the first switch/server and the called destination. When making an outgoing call from the second station 140*b*, the mobility agent 150 in the second switch/server 104 sends an appearance update message 218 to the mobility agent 150 in the first switch/server providing the call appearance selected for the second station 140*b* for the call. In this way, the call appearances selected for the first and second stations 136*a* and 140*b* for the outgoing call are the same and conflicts in which the same call appearance is selected for different calls are avoided.

Button status update messages 208 and 212 are used for the continuous update of buttons that are tracked (e.g., call appearances and bridged appearances). When an update message is received by a mobility agent 150, the agent updates the host (e.g., first or second) switch/server's button/key record for the controlled station (e.g., the first or second station). Available update messages 208 and 212 include idle, alerting with and without ringing and in-use states. The stimulus for such messages is the activation of button/key of the first or second station, as appropriate. Thus, when a feature button is pressed at the second switch/server 104, the mobility agent 150 in the second switch/server sends an update message 212 to the first switch/server so the desired feature is activated or deactivated. When a button status at the first station 136*a* changes, the mobility agent 150 in the first switch/server 100 sends an update message 208 so the second station can be updated. When calls are launched by button origination (i.e., abbreviated dial) from the second switch/server to the first switch/server, status updates for the call appearance are included in the setup and not sent in separate messages.

Status buttons/keys are thus processed by the first switch/server 100. When a status button/key is pressed in the second station 140*b*, a button status update message 212 is sent by the mobility agent 150 in the second switch/server 104 to the mobility agent 150 in the first switch/server 100. The feature is then activated in the first switch/server 100. This home switch feature processing is done to save a phone call. For example, when the pressed status button/key is "send all calls" the first switch/server 100 and not the second switch/server 104 knows how to route the extension.

Figure 2:
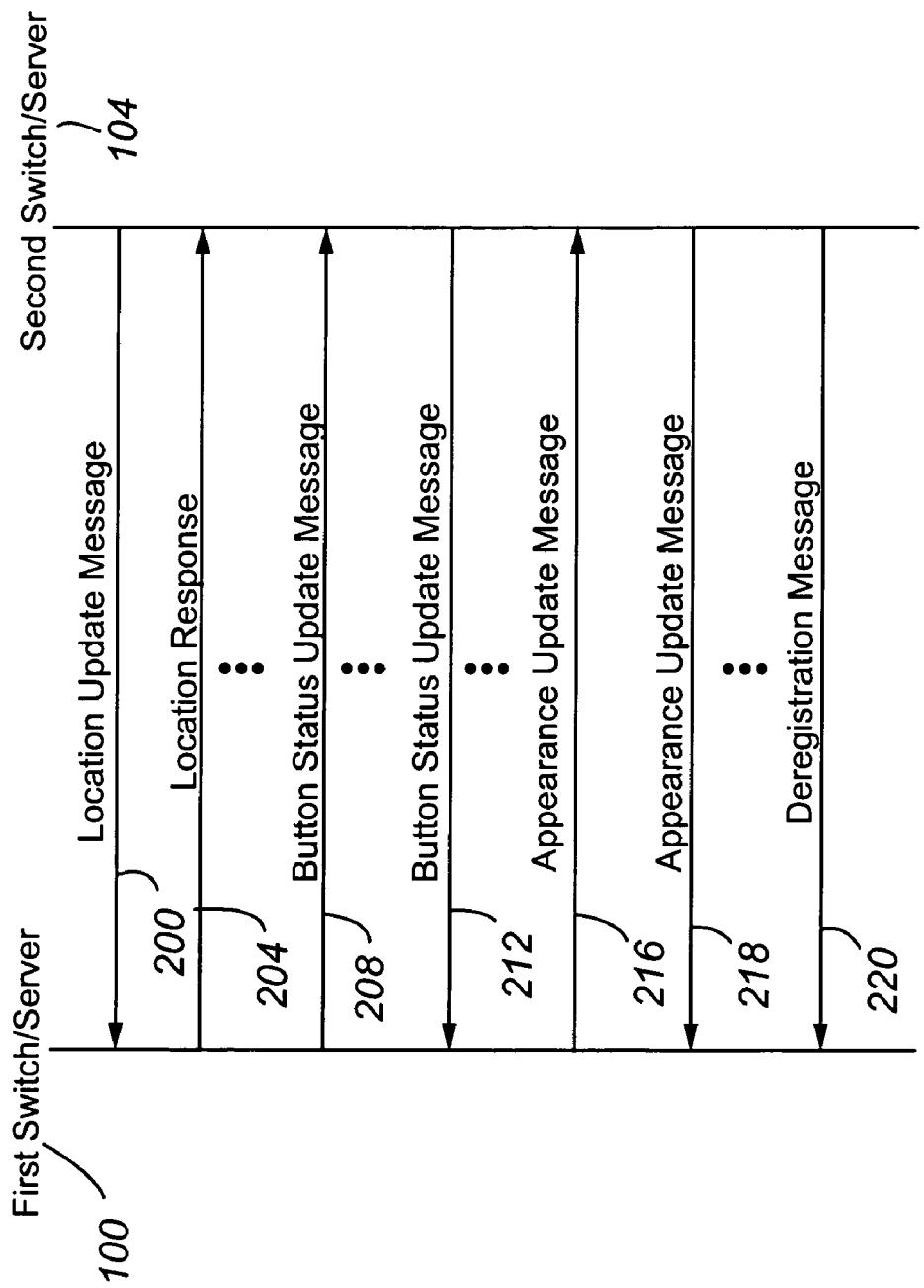
FIG. 2 is an inter-switch signal flow diagram according to an embodiment of the present invention.
Figure 3:
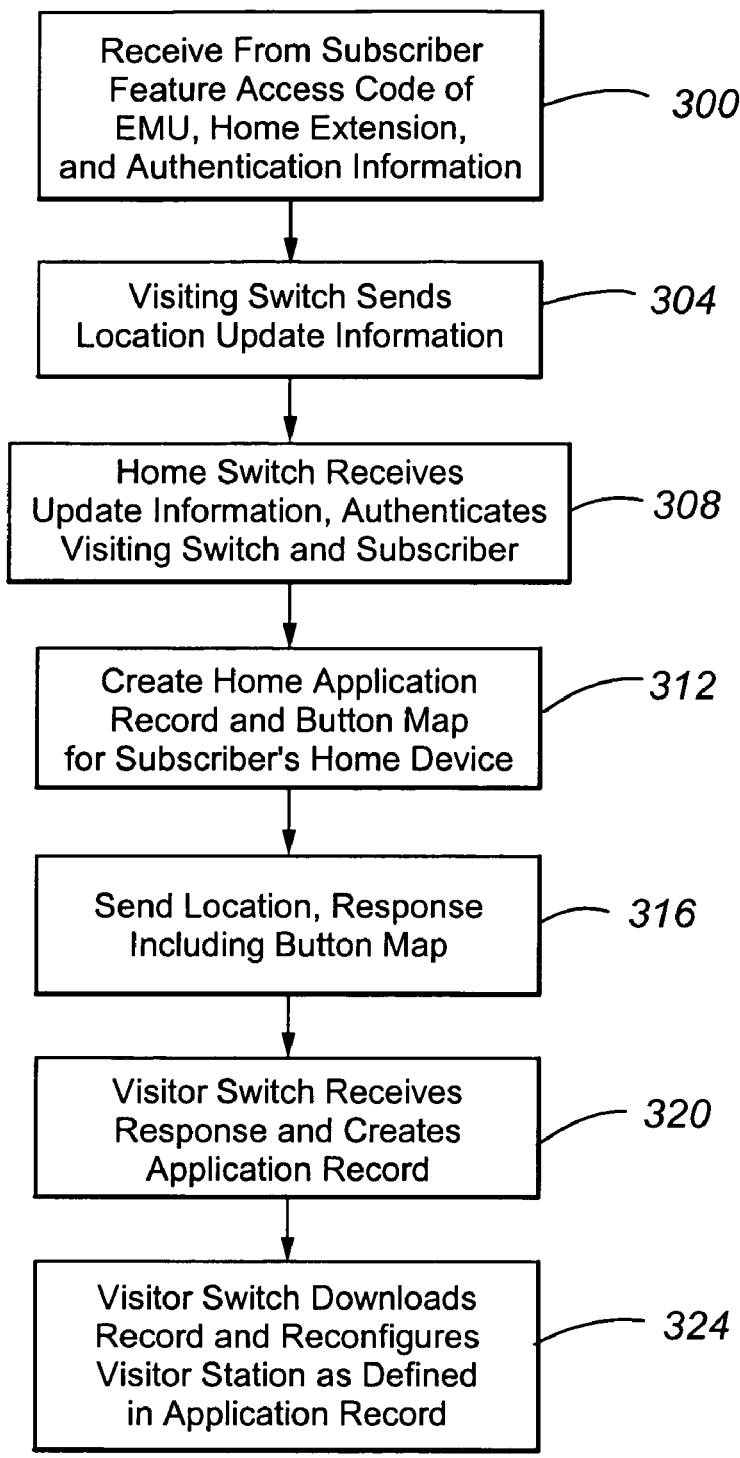
FIG. 3 is a flow chart according to an embodiment of the present invention.

Although not depicted in FIG. 2, message waiting update messages are used to notify the second switch/server 104 of the first subscriber's message waiting lamp status and update that status whenever it changes.

A number of variations and modifications of the invention can be used. It would be possible to provide for some features of the invention without providing others.

For example in one alternative embodiment, the above functionality is applied to packet-switched communications. The various messages and data structures noted above are used except that the messages are packetized and transmitted over the second network 110, which is the same network used by the voice bearer channel.

In another alternative embodiment, the concepts of the invention are applied to enable intra-switch/server mobility.

In this embodiment, the home and visited stations are controlled by a common switch/server. For example, the first or home station 136*a* and a second or visited station 136*b* are controlled by the first switch/server 100. To enable subscriber mobility on the premises 100, the home station record 160 for the first station 136*a*, home application record 164 for the first station 136*a*, native station record 168 for the second station 136*b*, and visitor application record 172 for the second station 136*b* are all located in the memory of the first switch/server 100.

In yet another embodiment, a feature accessible from the remote or visited station is Off Premises Telephony Integration Mobility or OPTIM. This feature allows the first subscriber to receive an incoming call on either his cellular phone or wired station and easily transfer an answered call from his cellular phone to the wired station by simply pressing a button (such as a call appearance button) on the wired station. Alternatively, the subscriber can transfer an answered call from the wired station to the cellular phone by pressing a feature button on the wired station, which initiates a call to the cellular phone. Additionally, a call from the cellular phone appears to the callee to be a local call from the wired station.

In yet another embodiment, dedicated hardware implementations including, but not limited to, Application Specific Integrated Circuits or ASICs, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be stated that the software implementations of the present invention are optionally stored on a tangible storage medium, such as a magnetic medium like a disk or tape, a magneto-optical or optical medium like a disk, or a solid state medium like a memory card or other package that houses one or more read-only (non-volatile) memories. A digital file attachment to e-mail or other self-contained information archive or set of archives is considered a distribution medium equivalent to a tangible storage medium. Accordingly, the invention is considered to include a tangible storage medium or distribution medium and prior art-recognized equivalents and successor media, in which the software implementations of the present invention are stored.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
    (a) receiving a voice call for one of a first and a second subscriber, wherein the first subscriber currently has a first communication device as a home station but is currently registered at a second communication device, wherein the first and second communication devices are serviced by differing switches and/or servers and are concurrently enabled for communication; and
    (b) applying the following rules:
        (B1) when the voice call is for the first subscriber, the voice call is received first by a first switch and/or server, and the first switch and/or server determines from an application record that the first subscriber is currently registered at the second communication device and forwards, to a second switch and/or server, a call set up message associated with the received voice call; and
        (B2) when the voice call is for the second subscriber, the voice call is received first by the second switch and/or server, and the second switch and/or server treats the voice call as mandated by a native station record associated with the second communication device,
    wherein the second subscriber is able to receive incoming calls to the second communication device, make calls remotely using, as call origination information, a number of the second communication device, and access remotely features of the second communication device and the first subscriber is able to receive incoming calls at, make outgoing calls from, and access first communication device features from the second communication device thereby permitting the second subscriber to be a remote user of the home station while the home station is in use by the another subscriber.

2. The method of claim 1, wherein when rule (B1) applies:
    the first switch and/or server and not the second switch and/or server controls the voice call; and
    the first switch and/or server generates and sends an appearance update message update message containing a private number for the first communication device, a private number for the second communication device, an identifier of the voice call, and a call appearance selected for the voice call, whereby a common call appearance is used for the first and second communication devices for the voice call.

3. The method of claim 1, wherein when rule (B2) applies:
    the second switch and/or server does not ring the second communication device.

4. The method of claim 1, wherein outgoing voice calls from the first subscriber using the second communication device are processed by the second switch and/or server, wherein call origination features accessed by the first subscriber using the second communication device are at the first switch and/or server, and wherein button status update messages are exchanged between the first and second switches and/or servers to provide updates on button status changes at the first and second communication devices.

5. The method of claim 1, further comprising:
    receiving, by the second switch and/or server, a request from the first subscriber to be associated with the second communication device, wherein the second communication device is controlled by the second switch/server and the first communication device is controlled by a first switch and/or server;
    notifying, by the second switch and/or server, the first switch/server of the request; and
    associating, by the second switch/server, the second communication device with the first subscriber, whereby the first subscriber is able to make outgoing calls from and receive incoming calls at the second communication device and to access at least some features accessible by the first subscriber at the first communication device.

6. The method of claim 5, wherein the second communication device is normally associated with a second subscriber, wherein the request notification comprises a number of the second communication device, a number of the first communication device, and the first communication device type and wherein the associating step comprises the sub-steps:
    the first switch and/or server creating a home application record and a button map of the first communication device;
    the first switch and/or server forwarding a first communication device type, button map, message waiting state indicator, first communication device number, and first subscriber's name to the second switch/server;
    using the first communication device type, button map, message waiting state indicator, first communication device number, and first subscriber's name, the second switch and/or server creating a visitor application record associating the first subscriber with the second communication device; and
    the second switch and/or server reconfiguring the second communication device as defined in the visitor application record.

7. The method of claim 1, wherein the second communication device is normally associated with the second subscriber, wherein the second switch and/or server comprises a native communication device record for the second communication device, wherein the first switch and/or server comprises a visitor application record for the second communication device, wherein the native communication device record is associated with the second subscriber, and the visitor application record is associated with the first subscriber, wherein the native communication device record is, while the first subscriber is associated with the second communication device, associated with a virtual communication device, wherein the virtual communication device and second communication device have a common number, wherein the first switch and/or server comprises a home communication device record for the first communication device, the home communication device record configuring the first communication device for the first subscriber and a home application record to redirect incoming calls for the first communication device to the second communication device, wherein the first and second communication devices are at least one of circuit-switched and time division multiplexed, wherein at least most of the following features are available to the first subscriber while the first subscriber is associated with the second communication device:

bridging an incoming call to the first subscriber onto the first communication device, call coverage, speed-dialing, ringing patterns, customized button labels, abbreviated dial list, automatic call back, automatic message waiting, automatic intercom, busy indication for another extension or trunk, call appearance, call forwarding, call forward (busy/do not answer), dial intercom, extension to cellular, exclusion, personal Central Office-line, send all calls, internal extension group, priority calling, and attendant calling, wherein, for outgoing calls from the second subscriber device, a number of the first communication device is sent as calling party information while the first subscriber is associated with the second communication device, wherein, when an outgoing call to a universal emergency number is made from the second communication device, the first subscriber is disassociated automatically with the second communication device, and wherein the visitor application record comprises at least the following information: the first subscriber's name, the first communication device's number, the second communication device's number, the first subscriber's home security information, the first and second communication device types, call state information, and a second communication device button record having a set of a plurality of buttons identical to a set of a plurality of buttons on the first communication device and wherein the native communication device record comprises at least the following information: second subscriber's name, second communication device's private number, second communication device's public number, second subscriber's home security information, second communication device type, second communication device's button record configured for the second subscriber, class of service for the second communication device, and call state information, wherein the home communication record comprises at least the following information: first subscriber's name, first communication device's private number, first communication device's public number, first subscriber's home security information, first communication device type, first communication device button record configured for the first subscriber, class of service for the first communication device, and call state information, and wherein the home application record comprises at least the following information: the number of the second communication device and the second communication device type, a pointer to a home station record for the first station, and wherein the home communication device record and home application record are associated with one another.

8. The method of claim 7, wherein, when an incoming call is directed by the first switch and/or server to the second switch and/or server, the first switch and/or server sends to the second switch and/or server a call appearance selected for the call and wherein, when an outgoing call is directed by the second switch and/or server to the first switch and/or server, the second switch and/or server sends to the first switch and/or server a call appearance selected for the call.

9. The method of claim 1, wherein, while the first subscriber is associated with the second communication device, incoming calls to the second subscriber are processed as defined in a native communication device record and not directed to the second communication device, and incoming calls to the first subscriber are directed by the first switch and/or server to the second switch and/or server and by the second switch/server to the second communication device, and outgoing calls from the first subscriber initiated using the second communication device are directed by the second switch/server to the first switch and/or server setup with called destination.

10. A non-transitory computer readable medium comprising processor executable instructions to perform the steps of claim 1.

\* \* \* \* \*